United States Patent [19]

Birnbach

[11] Patent Number: 4,786,128

[45] Date of Patent: Nov. 22, 1988

[54] DEVICE FOR MODULATING AND REFLECTING ELECTROMAGNETIC RADIATION EMPLOYING ELECTRO-OPTIC LAYER HAVING A VARIABLE INDEX OF REFRACTION

[75] Inventor: Curtis A. Birnbach, Bronx, N.Y.

[73] Assignee: Quantum Diagnostics, Ltd., Hauppauge, N.Y.

[21] Appl. No.: 936,761

[22] Filed: Dec. 2, 1986

[51] Int. Cl.[4] .............................................. G02B 6/10
[52] U.S. Cl. .................. 350/96.14; 350/356; 378/85
[58] Field of Search ............ 350/96.14, 164, 356; 378/84, 85, 91

[56] References Cited

U.S. PATENT DOCUMENTS

| | | | |
|---|---|---|---|
| 3,695,745 | 10/1972 | Furukawa | 350/96.14 |
| 3,871,747 | 3/1975 | Andrews | 350/96.14 |
| 3,898,585 | 8/1975 | Heidrich et al. | 350/96.14 X |
| 4,261,771 | 4/1981 | Dingle et al. | 378/84 X |
| 4,675,889 | 6/1987 | Wood et al. | 378/84 |

FOREIGN PATENT DOCUMENTS

| | | | |
|---|---|---|---|
| 186 | 1/1979 | Japan | 350/96.14 |
| 959013 | 9/1982 | U.S.S.R. | 350/356 |

OTHER PUBLICATIONS

Underwood et al., "Layered Synthetic Microstructures as Bragg Diffractors for X-rays and Extreme Ultraviolet: Theory and Predicted Performance", *Applied Optics*, vol. 20, No. 17, Sep. 1, 1981.

Primary Examiner—James B. Mullins
Attorney, Agent, or Firm—Ostrolenk, Faber, Gerb & Soffen

[57] ABSTRACT

A multi-layer device for modulating and reflecting light. The device is formed of an electro-optic layer with a variable index of refraction sandwiched between two other layers having a pre-determined index of refraction. An electric field applied across the electro-optic layer controls the index of refraction of the layer and thus the reflectance and transmittance of light through the multi-layer stack. The device can therefore be used as a mirror, window, beam-splitter, shutter, light modulator, or other optical logic element.

13 Claims, 5 Drawing Sheets

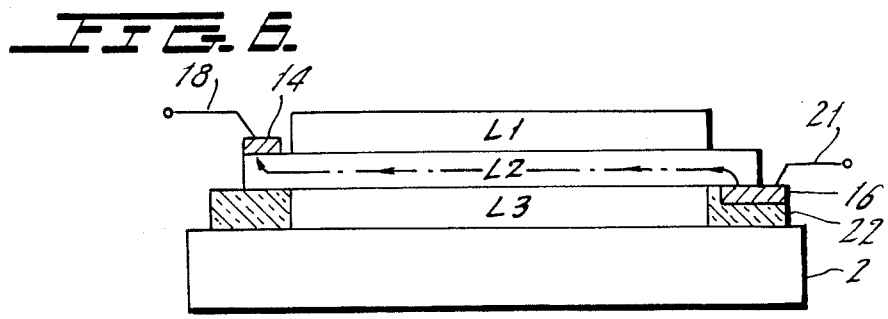
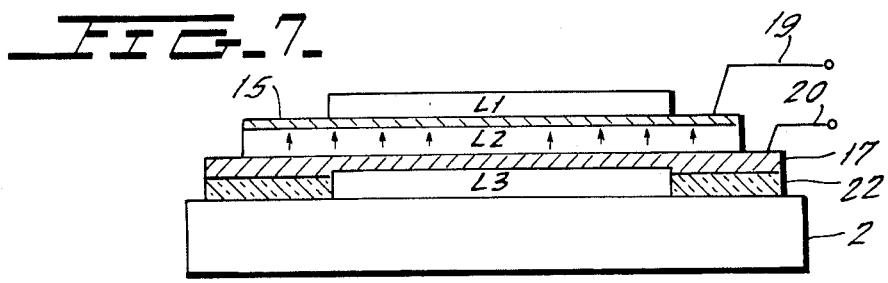
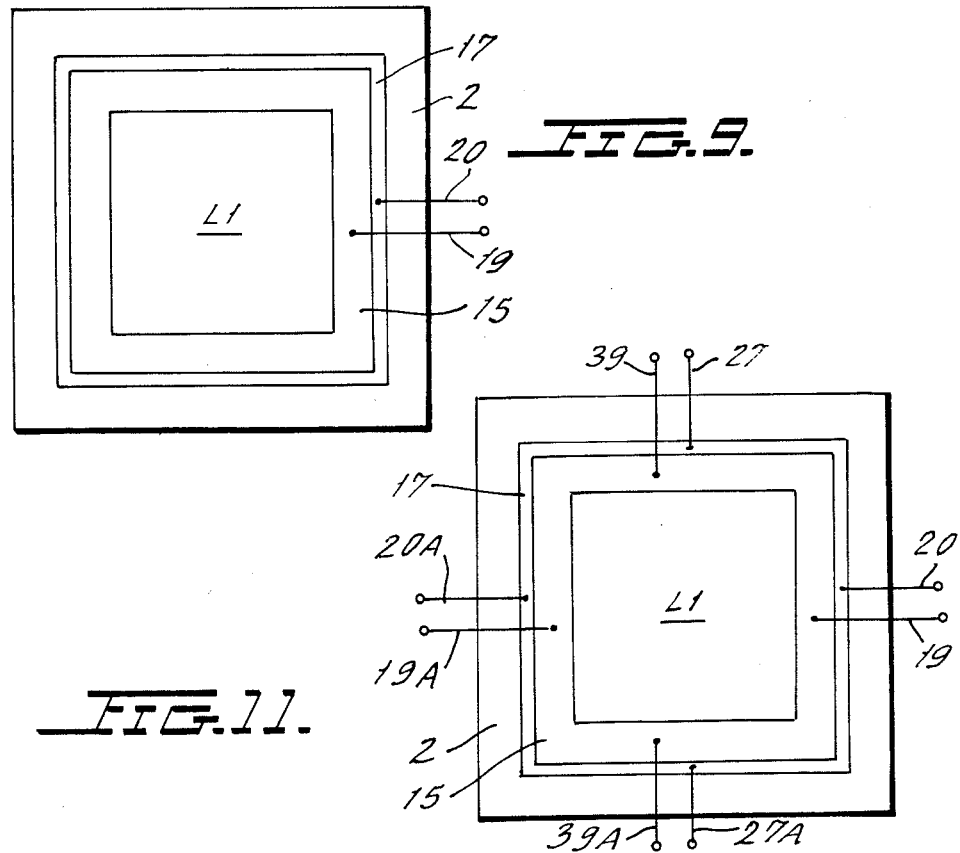

DEVICE FOR MODULATING AND REFLECTING ELECTROMAGNETIC RADIATION EMPLOYING ELECTRO-OPTIC LAYER HAVING A VARIABLE INDEX OF REFRACTION

BACKGROUND OF THE INVENTION

1. Field of the Invention

The present invention relates to a device for modulating and reflecting incident light, and more specifically to a multi-layer device with at least one layer formed of an electro-optic material having a variable index of refraction.

2. Description of Related Art

A typical reflecting device is a first-surface mirror formed of a substrate coated with a metal film or other reflective material. FIG. 1 shows such a device, including a substrate 2 having on its upper surface a coating of metal film. The metal film is typically formed with a layer thickness of greater than 5 microns. First surface metal mirrors generally exhibit a high reflectivity over a broad band spectrum of incident light.

Another conventional mirror configuration is a dielectric stack 6 formed above the substrate 2. As shown in FIG. 2, the dielectric stack may consist of three layers, layers L1 and L3 having a high index of refraction and layer L2 having a low index of refraction. Each layer, L1, L2 and L3, has a thickness of one-quarter wavelength.

As shown in FIG. 2, the change in index of refraction between the layers in the dielectric stack results in the reflection of the incident light. Layers L1 and L3 could thus obviously be formed of a material with a low index of refraction, and layer L2 could be formed of a material with a high index of refraction. Similarly, the stack can have any odd number of layers, e.g., three, five, seven or nine, and may be formed of multiple cells (stacks). In any event, however, because the one-quarter wavelength thickness of the layers is based on a certain wavelength of incident light, a dielectric mirror tends to have a very narrow spectral range of reflectance. Moreover, a dielectric mirror is "static" in the sense that it has no capability to modulate reflected light, nor can it be used to transmit a portion of the incident light and reflect the remaining portion.

U.S. Pat. No. 4,054,362 to Baues, issued Oct. 18, 1977 discloses a device for modulating polarized light passing through an electro-optic material having a variable index of refraction. A plurality of strip electrodes are disposed on the electro-optic layer with adjacent strips connected to opposite poles of a voltage source to form an interdigital electrode structure. The application of a modulated voltage to the interdigital structure creates electric fields in the electro-optic material extending parallel to the direction of propagation of light in the material to create changes in the index of refraction of the material.

In the absence of an electric field applied to the electrode structure, the electro-optic material acts as a waveguide, and the incident polarized light passes through the material. When a voltage is applied to the electrodes, electric fields are produced in successive opposite orientations in the material beneath the electrodes and extend parallel to the propagation of light. The fields change the index of refraction of the material and cause multiple reflections of the light, causing light interference if appropriate space between electrodes is employed. Thus, the light transmitted through the crystal can be varied between a maximum intensity and a total extinction.

The structure and operation of the device described above limits its use to the modulation of only polarized incident light. Also, like the dielectric mirror, the device cannot be used to transmit a portion of the incident light and reflect the remaining portion.

SUMMARY OF THE INVENTION

An object of the present invention is therefore to provide a light modulator and reflector that can operate on light of any polarization state over a wide range of wavelengths.

Another object of the present invention is to provide a light modulator and reflector with variable reflectivity and transmissivity.

A further object of the present invention is to provide a light modulator and reflector which can be adjusted to have an extremely high reflectivity.

A still further object of the present invention is to provide a device which can be used alternatively as a mirror, window, beam-splitter, shutter, input/output device, light modulator, or optical logic element.

A still further object of the present invention is to provide a device which can be utilized as a two-dimensional spatial light modulator.

The foregoing objects are achieved in accordance with the present invention which comprises a multi-layer stack having at least one sandwiched layer formed of an electro-optic material with a variable index of refraction. By applying an electric field across the electro-optic material, the index of refraction of the material is varied, and the reflectivity/transmissivity of the multi-layer stack is thereby correspondingly varied.

In a first embodiment of the invention, electrodes are applied on opposite faces of the electro-optic layer at opposite edge portions of the electro-optic layer such that the electric field travels horizontally through the electro-optic layer.

In a second embodiment of the invention, the electrodes are applied as layers on the entirety of opposite faces of the electro-optic layer such that the electric field travels vertically through the layer.

In a variation of the first embodiment of the present invention, the electro-optic layer having a variable index of refraction is provided with two orthogonal sets of electrodes on opposite edges and faces which may be electrically addressed with a quadrature feed to yield a two-dimensional spatial light modulator. Similarly, the layer electrodes applied to the electro-optic layer of the second embodiment may also be provided with quadrature leads to allow two-dimensional spatial light modulation.

In a further embodiment of the invention, the device comprises a multi-layer sandwich including a plurality of electro-optic layers having a variable index of refraction, each of the electro-optic layers being addressed with a quadrature feed. In a still further embodiment of the invention, the layers of electro-optic material with a variable index of refraction are driven independently.

In a still further embodiment of the invention, each layer of the mirror is formed of an electro-optic material and each layer is driven independently.

The present invention may also be formed of a plurality of layers of material of high and low electron density for use as an x-ray mirror.

In its various embodiments, the present invention may be used as a window, beam-splitter, shutter, mirror, input/output device, light modulator, optical logic element or as an electronic/optical convertor.

Other features and advantages of the invention are described below, with reference to the accompanying drawings.

BRIEF DESCRIPTION OF THE DRAWINGS

FIG. 6 is a full side view of the first embodiment of the present invention shown partially in FIG. 4, showing the electric field oriented horizontally.

FIG. 7 shows a full side view of the second embodiment of the present invention shown in FIG. 5, with the electric field travelling vertically.

FIG. 9 shows a top view of the second embodiment of the present invention.

FIG. 11 shows a top view of the quadrature feed arrangement for the second embodiment of the present invention.

DETAILED DESCRIPTION OF THE PREFERRED EMBODIMENTS

Figure 1:
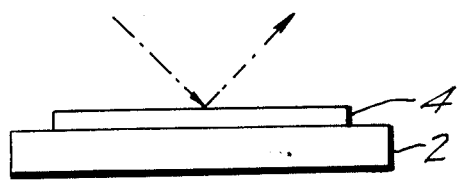
FIG. 1 shows a conventional metal mirror formed of a substrate coated with metal film.
Figure 2:
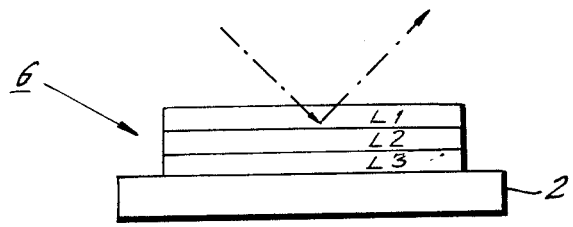
FIG. 2 shows a conventional dielectric mirror formed of a substrate and dielectric stack thereon.
Figure 3:
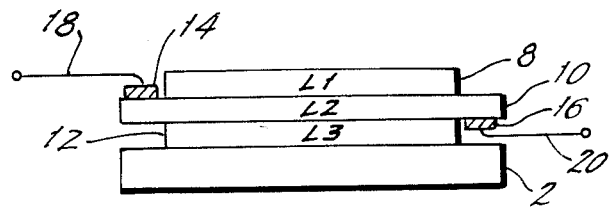
FIG. 3 shows a representative side view of the general configuration of the first embodiment of the present invention in a three-layer configuration.

Referring first to FIG. 3, there is shown therein a representative side view of the basic structure of the first embodiment of the present invention. For purposes of illustration, the present invention, like the dielectric stack of the prior art, is shown as comprised of three layers, L1, L2 and L3, labelled on FIG. 3 with numerals 8, 10 and 12, respectively. Actually, the present invention is preferably formed of nine to eleven layers to increase the potential reflectivity. Like the dielectric stack, the odd-numbered layers of the present invention, layers L1 and L3, may be formed of a material with a high index of refraction. Layer L2, however, is formed of an electro-optic material such as BSO (bismuth silicate) SBN (strontium barium niobate), $LiNbO_3$, KDP, or the like, which has a variable index of refraction.

As shown in FIG. 3, a pair of electrodes 14, 16 are formed on opposite faces and at opposite edges of layer L2, with leads 18 and 20 provided for applying an electric field thereto.

Figure 4:
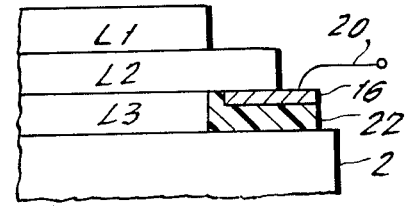
FIG. 4 is an enlarged partial side view of the actual configuration of the first embodiment of the present invention showing the connection of a electrode to the electro-optic layer.

FIG. 4 shows an expanded side view of the actual connection of electrode 16 and lead 20 to the underside of layer L2 in the first embodiment. As shown, a layer of insulating material 22, preferably $SiO_2$, is formed on the top surface of the substrate, and electrode 16 is sandwiched between insulating material 22 and layer L2. Lead 20 then is attached to the upper surface of electrode 16.

Figure 5:
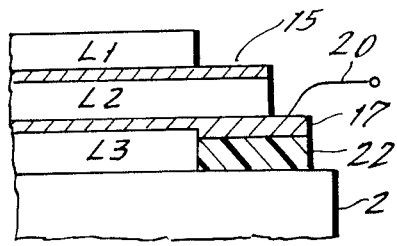
FIG. 5 shows an enlarged partial side view of the second embodiment of the present invention with layer electrodes applied on the entirety of opposite faces of the electro-optic layer.

FIG. 5 shows an expanded side view of the second embodiment of the present invention in which electrodes 15, 17 are formed in layers across the entire top and bottom faces, respectively, of the electro-optic layer L2. Both layer electrodes 15, 17 are coupled to leads (only lead 20 to electrode 17 is shown in FIG. 5), and layer electrode 17 rests on insulating support structure 22 at the edges of the device.

In the actual manufacture of the present invention, the substrate, preferably formed of a transparent material such as quartz or BK-7 glass, is cleaned by etching approximately 100 Å from the top surface. A layer of insulating material 22 is then deposited, preferably by sputtering, over the entire substrate. A microlithography sequence follows, in which photoresist is spun on the substrate. The substrate is then baked, exposed developed, baked, etched and stripped. The sequence yields an insulator support structure on the edges of the substrate with a central void.

The bottom layer of the device, L3 is then deposited, again by sputtering, across the entire device such that it fills the void (any deposit of L3 on the insulator structure may be removed by a further microlithography sequence and etching). A layer electrode, preferably indium tin oxide (ITO), is then sputtered with a thickness of 100-200 Å across the entire device. In the case of the first embodiment, the ITO 16 is removed from the central portion of the device by microlithography and etching. For the second embodiment, the ITO layer 17 remains across the entire device and, after deposition of the electro-optic layer L2, a second ITO layer 15 is applied by reactive sputtering.

In both the first and second embodiments, layers L1, L2 and L3 are preferably of a thickness corresponding to approximately one-quarter wavelength as in a conventional dielectric stack. As is well known, if the thickness is not exactly a quarter wavelength, the device will have a broader bandwidth response.

In the second embodiment, the layer electrode must have approximately the same index of refraction (approximately 2.0) as layers L1 and L3 or an additional reflection will occur. Layers L1 and L3 are decreased in thickness a small amount (100-200 Å) from one-quarter wavelength to provide for the thickness of the layer electrode. Alternatively, to simplify manufacture of the device, it is possible to form layers L1 and L3 entirely of the transparent conductive material having a high index of refraction.

In the following discussion, it is assumed that the layers L1 and L3 are formed of a material having a high index of refraction. When no potential is applied between the electrodes, the variable layer L2 has a low index of refraction. The resultant high/low/high boundary between layers L1, L2 and L3 causes the invention to act as a mirror. When a potential is applied between electrodes 14 and 16, however, layer L2 changes from a low index of refraction to a high index of refraction, such that all three layers, L1, L2 and L3 have a high index of refraction, and the invention acts as a window. Obviously, the reverse situation could also exist, i.e., layer L2 could have a rest state with a high index of refraction, resulting in a change from a window to a mirror, rather mirror to window, upon the application of a potential to the electro-optic layer.

If, instead of a constant potential, a pulse of potential is applied between the electrodes, the present invention acts as a shutter. Likewise, if a potential of half the maximum voltage is applied between the electrodes, the present invention acts as a beam-splitter, reflecting half the light and passing half the light (apart from any absorption related effects). It is therefore apparent that the present invention can be used as a light modulator or as an optical logic element.

The operation of the first and second embodiments of the present invention is best shown schematically in FIGS. 6 and 7. The application of a potential between the electrodes 14, 16 of first embodiment as shown in FIG. 6 results in a horizontal electric field through the electro-optic layer L2. Conversely, the application of a potential between electrodes 17 and 19 of the second embodiment as shown in FIG. 7 results in a vertical electric field through the electro-optic layer L2.

Figure 8:
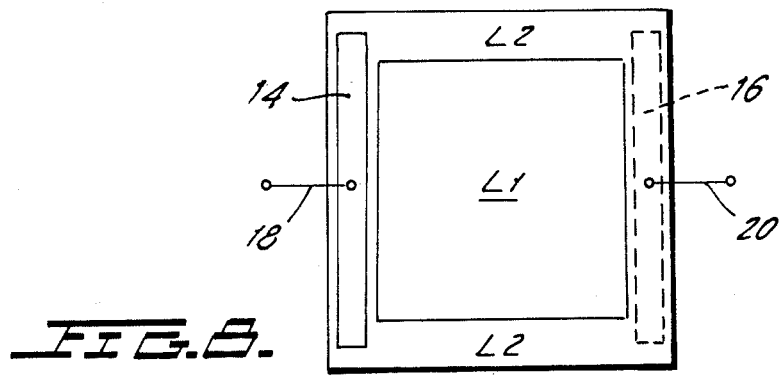
FIG. 8 shows a top view of the first embodiment of the present invention.

FIG. 8 shows a top view of the first embodiment of the present invention, wherein it is apparent that layer L2 has a larger area than layer L1 and electrodes 14, 16 are positioned on opposite edges and faces of layer L2. FIG. 9 shows a top view of the second embodiment of the present invention.

Figure 10:
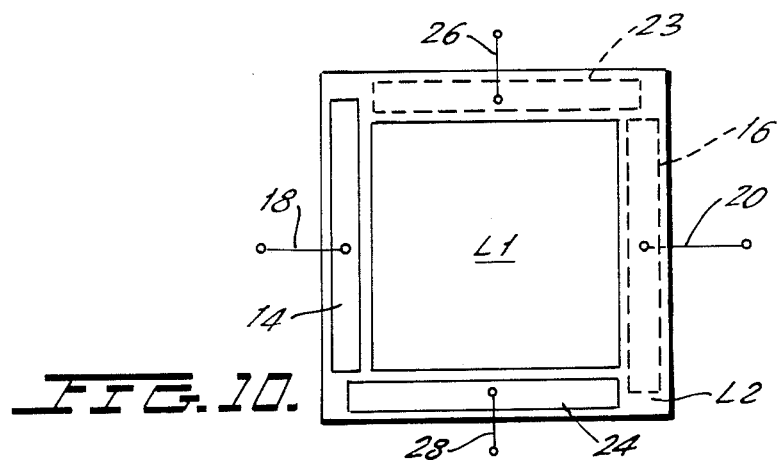
FIG. 10 shows a top view of the first embodiment of the present invention with an additional set of electrodes positioned in an orthogonal relationship to the first set, which allows the device to be used as a two-dimensional spatial light modulator.

FIG. 10 shows a variation of the invention with the electrode configuration of the first embodiment, with an additional pair of electrodes 24, 23 with corresponding leads 26, 28 attached thereto disposed othogonally to the first pair of electrodes 14, 16. In this variation of the invention, a quadrature output video signal may be applied to layer L2, such that the present invention may be used as a two-dimensional spatial light modulator. The signals respectively applied to the two sets of opposing electrodes have a 90° phase difference. Due to the high resistivity characteristics of the preferred electrode material ITO and the propagation of currents therethrough, this quadrature feed variation could also be used with layer electrode configuration of the second embodiment.

As shown in FIG. 11, the quadrature feed could be applied through leads 20, 20A, 27, and 27A to the lower ITO layer, and through leads 19, 19A, 39, and 39A to the upper ITO layer.

Figure 12:
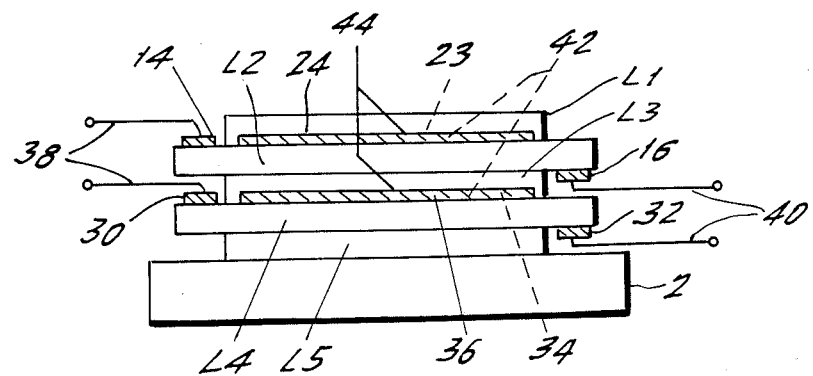
FIG. 12 shows a side view of the first embodiment of the invention with two electro-optic layers, each having two orthogonal sets of electrodes.

FIG. 12 shows an embodiment of the invention having five layers. The odd numbered layers L1, L3 and L5 are again assumed to be formed of a material with a high index of refraction, while the even numbered layers, L2 and L4, interleaved between the odd numbered layers, are formed of a material with a variable index of refraction. This "double-stack" results in a mirror having a higher reflection coefficient in the absence of a potential between the electrodes. As mentioned previously, in the preferred embodiment, from nine to eleven layers are used to obtain a reflectivity in excess of 95%. Electrodes 14, 16, 23, 24 of the upper layer are driven together with corresponding electrodes 30, 32, 34, 36 of the lower layer via leads 38, 40, 42, 44. Alternatively, as shown in FIG. 12, each even numbered layer, L2 and L4, having a variable index of refraction may be driven independently, allowing mixing of various signals.

Obviously, the present invention is not intended to be limited strictly by the embodiments discussed above. For instance, as mentioned previously, the odd numbered layers could consist of material having low index of refraction and the even numbered layers with a variable index of refraction. Moreover, the device can consist of any odd number of layers interleaved with even numbered layers having a variable index of refraction. Increasing the number of layers of the device will obviously increase its potential reflectivity, as well as increasing the versatility of the device, at the expense of increased difficulty to manufacture.

Advantageously, the present invention can also be configured for use as an x-ray mirror. In the embodiments described above, designed for operation in the visible spectrum, the layers, L1, L3 having a fixed index of refraction are formed of a dielectric semiconductor material having a one-quarter wavelength thickness. For application as an x-ray mirror, the layers of the device are much thinner, i.e., they are on the order of 150-200 Å thick, and many more layers are required because of their reduced reflectivity to x-rays, i.e., on the order of 150-200 layers are required.

The criteria for selecting the layers of the device are based on electron density, i.e., layers having a high electron density such as tungsten or rhenium could be sputtered alternatively with layers having a low electron density, such as carbon, aluminum, silicon, aluminum oxide, and silicon dioxide.

Figure 13:
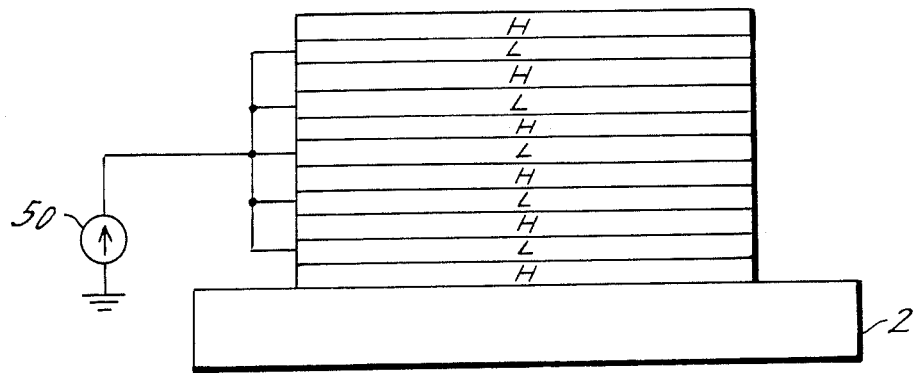
FIG. 13 shows a side view of the invention configured for use as an x-ray mirror with a current source being applied to increase the electron density in the layers having a low electron density.
Figure 14:
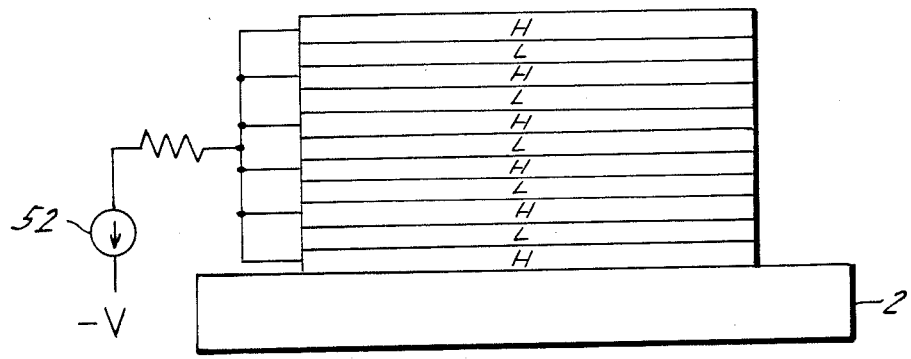
FIG. 14 shows a side view of the invention configured for use as an x-ray mirror with a current sink and load being applied to decrease the electron density of the layers having a high electron density.
Figure 15:
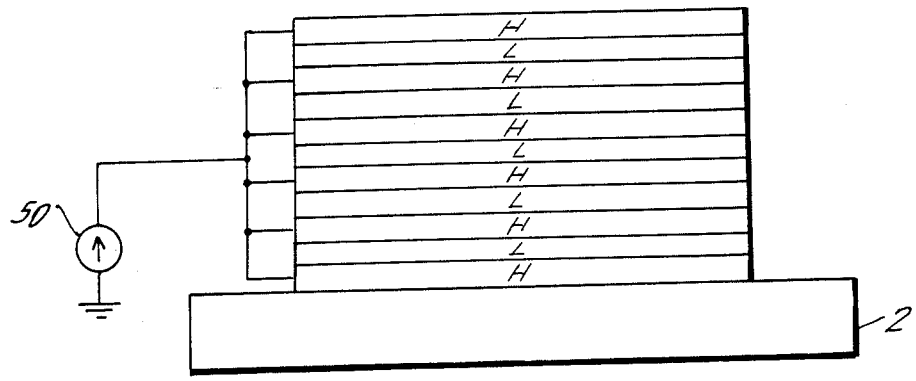
FIG. 15 shows a side view of the invention configured for use as an x-ray mirror with a current source being applied to increase the electron density in the layers having a high electron density.
Figure 16:
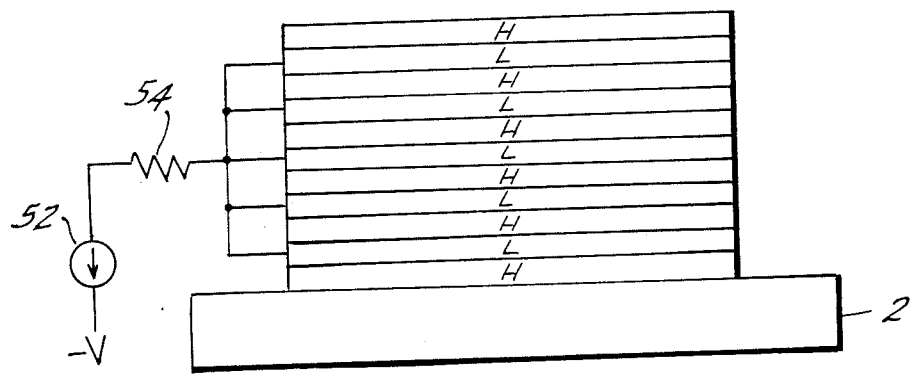
FIG. 16 shows a side view of the invention configured for use as an x-ray mirror with a current sink and load being applied to decrease the electron density of the layers having a low electron density.

To change the transmissivity of the device in, for example, a high/low/high configuration, the layer with a low electron density could be pumped with electrons from a current source 50 as shown in FIG. 13, or the layers with a high electron density could be drained of electrons with a current sink 52 and load 54 as shown in FIG. 14. Similarly, to vastly increase the reflectivity of the device, the layers with a high electron density could be pumped with electrons and/or electrons could be drained from the layers of low electron density.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A device for modulating and reflecting light, comprising:
   (a) a layer of electro-optical material having a variable index of refraction sandwiched between two layers of dielectric material having a pre-determined index of refraction; and
   (b) electrodes mounted on the outer edge portions on opposite faces of said electro-optic layer for applying a potential laterally across said electro-optic layer to vary the index of refraction of said electro-optic layer which controls the reflectance and transmittance of light through said device in a direction orthogonal to said layers.

2. A device for modulating and reflecting light as recited in claim 1, wherein said potential is applied to said electro-optic layer from two orthogonal directions.

3. A device for modulating and reflecting light as recited in claim 1, comprising a plurality of said layers of electro-optic material, each sandwiched between said layers of material having a pre-determined index of refraction.

4. A device for modulating and reflecting light as recited in claim 3, wherein the potentials applied across each of said electro-optic layers are driven independently.

5. A device for modulating and reflecting light as recited in claim 1, comprising a plurality of said layers of electro-optic material, each sandwiched between said layers of material having a pre-determined index of refraction said potential being applied to each of said electro-optic layers from two orthogonal directions.

6. A device for modulating and reflecting light as recited in claim 5, wherein the potential applied across said electro-optic layer in the first of said two orthogonal directions is driven independently of the potential applied in the second of said two orthogonal directions.

7. A device for modulating and reflecting light as recited in claim 6, wherein said potentials applied in said first and second orthogonal directions comprise a quadrature output video signal.

8. A device for modulating and reflecting light, comprising:
(a) a layer of electro-optical material having a variable index of refraction sandwiched between two layers of dielectric material having a pre-determined index of refraction; and
(b) thin layer electrodes having substantially the same pre-determined index of refraction as said two layers of dielectric material, said thin layer electrodes mounted on substantially the entirety of opposite faces of said electro-optic layer and disposed between said electro-optic layer and each of said two layers of material having a pre-determined index of refraction for applying a potential across said electro-optic layer to vary the index of refraction of said electro-optic layer which controls the reflectance and transmittance of light through said device in a direction orthogonal to said layers.

9. A device for modulating and reflecting light as recited in claim 8, wherein said potential is applied to said electro-optic layer from two orthogonal directions.

10. A device for modulating and reflecting x-rays, comprising a plurality of layers of material having a high electron density interleaved with a plurality of layers having a low electron density, wherein the transmittance of said device to x-rays travelling through said device in a direction orthogonal to said plurality of layers is increased by increasing the electron density in said layers having a low electron density by applying a current source thereto.

11. A device for modulating and reflecting x-rays, comprising a plurality of layers of material having a high electron density interleaved with a plurality of layers having a low electron density, wherein the reflectance of said device to x-rays travelling in a direction orthogonal to said pluralities of layers is increased by increasing the electron density in said layers having a high electron density by applying a current source thereto.

12. A device for modulating and reflecting x-rays, comprising a plurality of layers of material having a high electron density interleaved with a plurality of layers having a low electron density, wherein the transmittance of said device to x-rays travelling through said device in a direction orthogonal to said plurality of layers is increased by decreasing the electron density in said layers having a high electron density by applying a current sink and load thereto.

13. A device for modulating and reflecting x-rays, comprising a plurality of layers of material having a high electron density interleaved with a plurality of layers having a low electron density, wherein the reflectance of said device to x-rays travelling in a direction orthogonal to said pluralities of layers is increased by decreasing the electron density in said layers having a low electron density by applying a current sink and load thereto.

* * * * *